United States Patent [19]

Irie

[11] Patent Number: 4,830,321
[45] Date of Patent: May 16, 1989

[54] MAGNETIC HOLDER

[75] Inventor: Kenji Irie, Osaka, Japan

[73] Assignee: Ken Ken Co., Ltd., Osaka, Japan

[21] Appl. No.: 60,312

[22] Filed: Jun. 10, 1987

[51] Int. Cl.$^4$ ............................................. F16B 47/00
[52] U.S. Cl. ............................... 248/206.5; 248/309.4
[58] Field of Search ............................ 248/206.5, 309.4; 211/89, DIG. 1; 281/45 A

[56] References Cited

U.S. PATENT DOCUMENTS

| | | | |
|---|---|---|---|
| 1,602,341 | 10/1926 | Day | 211/89 X |
| 2,549,200 | 4/1951 | Hooks | 211/89 X |
| 2,629,154 | 2/1953 | Micucci | 211/89 X |
| 2,693,370 | 11/1954 | Wheatley | 281/45 A X |
| 2,977,082 | 3/1961 | Harris | 248/206.5 |
| 3,350,045 | 10/1967 | Mayers | 248/206.5 X |
| 4,039,082 | 8/1977 | Ladinsky | 248/206.5 X |
| 4,085,848 | 4/1978 | Tsuge | 211/89 X |
| 4,100,684 | 7/1978 | Berger | 248/206.5 X |

FOREIGN PATENT DOCUMENTS 1289513  2/1969  Fed. Rep. of Germany ... 281/45 A X
57-47183 10/1982  Japan .

Primary Examiner—Ramon O. Ramirez
Attorney, Agent, or Firm—Wenderoth, Lind & Ponack

[57] ABSTRACT

A magnetic holder has a movable body made of a material upon which a magnet can function. The movable body is attached at its center to the center of the upper surface of the magnet. The lower surface of the magnet can be attached to any surface upon which a magnet can function. The surface of the movable body which faces the magnet is divided into sections radially centering on the center point of that surface. When the movable body is caused to move so that one of its sections is attached to the magnet by magnetic force the other sections are separated from the upper surface of the magnet. Paper is held to the surface upon which the magnetic holder is placed by the clipping part on the end of the section of the movable body which is attached to the magnet.

This magnetic holder allows papers to be held to and removed from the appropriate surface easily and without danger of the magnetic holder being dropped from said surface during operation. Furthermore the requirement of only one relatively week magnet reduces the cost of production of this one-touch magnetic holder.

6 Claims, 2 Drawing Sheets

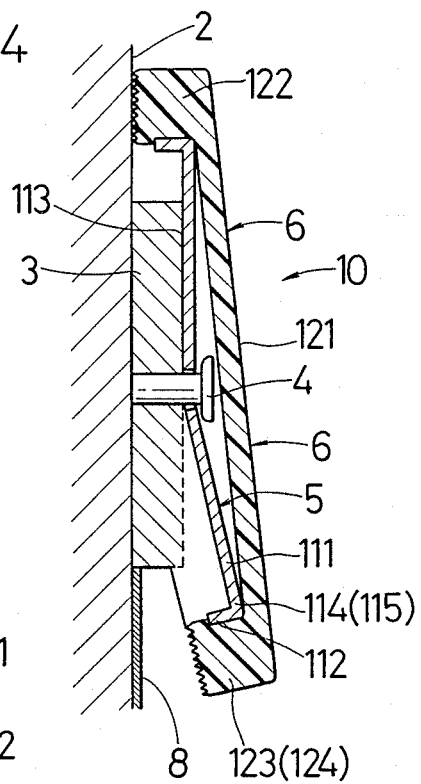
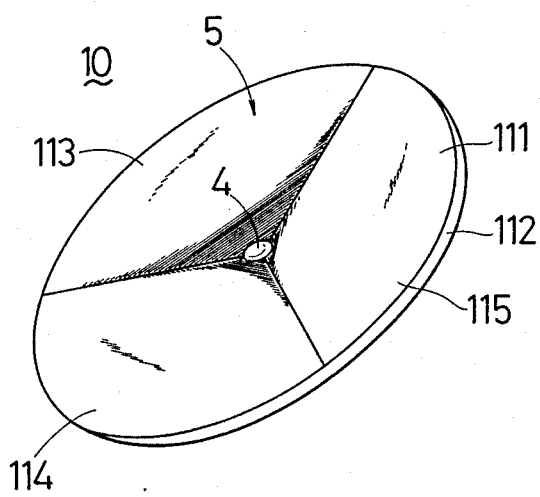
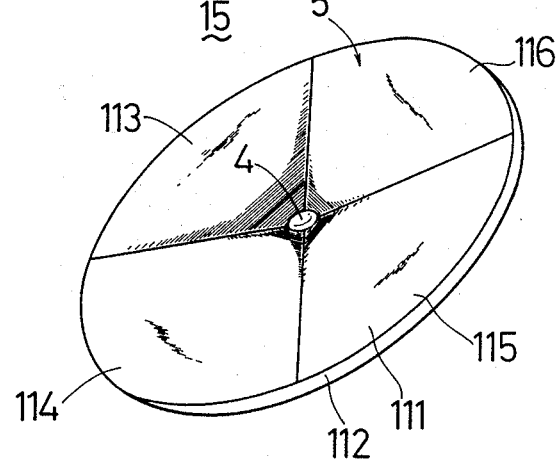

MAGNETIC HOLDER

BACKGROUND OF THE INVENTION

1. Field of the Invention

The present invention relates to a magnetic holder which allows paper and similar materials to be held to and removed from any surface upon which a magnet can function.

2. Description of the Prior Art

The magnetic holder consists of a body and two magnets. The body is constructed from a material upon which a magnet can function. The body is a rain-pipe type structure of a squared U-shape. The body is bent at a fixed angle in the center to form two separate sections each of which contains a magnet. Each magnet is able to hold its section of the body to any surface upon which a magnet can function. One magnet and its section of the body can hold a paper to the appropriate surface while the other magnet and its section of the body is separated from the same surface by the fixed angle at which the body is bent. When the section of the body separated from the surface upon which a magnet can function is pressed to that surface with one movement of one hand, the paper, held to the same surface by the other section of the body and its magnet is released. Thus a paper can be held to and removed from an appropriate surface easily and without the necessity of removing and replacing the entire magnetic holder from the surface. (Japan Utility Model Gazette S. No. 57-47183)

At present, the cost of magnets represents a large proportion of the total cost of the production of a conventional magnetic holder and thus the number of magnets required is a key factor in production cost. Therefore the production of the conventional magnetic holder described above which requires two magnets is more expensive than that of a magnetic holder which would require a single magnet. There is a possibility that the magnetic holder may be dropped from the surface because there is a moment at which either magnet is attached to the surface during the movement required to fasten or to remove a paper from the surface. In order to reduce the possibility of dropping the magnetic holder, magnets of a strong force are needed. However, strong magnets require strong force to complete the movement and thus the operation of the magnetic holder becomes more difficult. Furthermore, as the strength of the required magnets increases so does the cost of production.

SUMMARY OF THE INVENTION

In order to achieve the above object, the composition of the present invention is described as follows.

The object of the present invention is to provide a magnetic holder which requires only one magnet, which is inexpensive to manufacture, and with which paper and simiilar materials can be easily held to and removed from any surface upon which a magnet can function without any possibility of the magnetic holder being dropped from the surface.

The magnetic holder consists of one board-type magnet which can be attached by its under surface to any surface, upon which a magnet can function, and a movable body. The center of the body is connected to the center of the upper-surface of the magnet in a way which permits movement. The movable body is constructed of a material upon which a magnet can function. The surface of the movable body which faces the magnet is divided into plural sections centering on the point of connection between the magnet and the movable body. The section are formed in a way so that when one section is attached to the upper surface of the magnet by magnetic force the other sections are separated from the upper surface of the magnet by an appropriate angle. Clipping parts are attached to the edges of erch section of the movable body. Each clipping part can hold a paper to the surface upon which the magnet is attached when the corresponding section of the body is attached to the upper surface of the magnet by magnetic force.

The operation of the magnetic holder of the present invention is described in the following section. The movable body is operated to move on the centerpoint of the movable body and the magnet so that one of the section of the movable body is attached by magnetic force to the upper surface of the magnet. The clipping part fixed to the edge of the section which is attached to the upper surface of the magnet clips a paper to the surface upon which the magnet is attached. The paper can be held easily and securely. To release the paper from the surface, any other section of the movable body can be easily attached to the upper surface of the magnet.

The cost of the production of the magnetic holder is reduced due to the fact that only one magnet is required. Furthermore, the magnetic holder can not be dropped from the surface to which it is fixed because the magnet remains in one position throughout the operations required to hold or to release a paper from the surface to which the magnetic holder is applied.

Because the magnetic holder can not be dropped from the surface, it is not necessary to strengthen the magnetic force. Thus the cost of production is further reduced. At the same time the operation of the magnetic holder is made easier owing to the fact that a strong magnet is not required and therefore less force is needed to operate the movable body of the magnetic holder.

BRIEF DESCRIPTION OF THE DRAWINGS

The drawings illustrate various embodiments of the present invention.

FIG. 1 is a perspective view of a vertical section broken away and the movement is depicted by imaginary lines.

FIG. 2 is a sectional view of the magnetic holder taken along line II—II of FIG. 1.

FIG. 3 illustrates the magnetic holder with the covering body removed.

FIGS. 4, 5 show the second embodiment of the present invention.

FIG. 4 is the equivalent of FIG. 1 for the second embodiment.

FIG. 5 is the equivalent of FIG. 3 for the second embodiment.

FIG. 6 illustrates the third embodiment of the present invention and is the equivalent of FIG. 3.

DETAILED DESCRIPTION OF THE PREFERRED EMBODIMENTS

Figure 1:
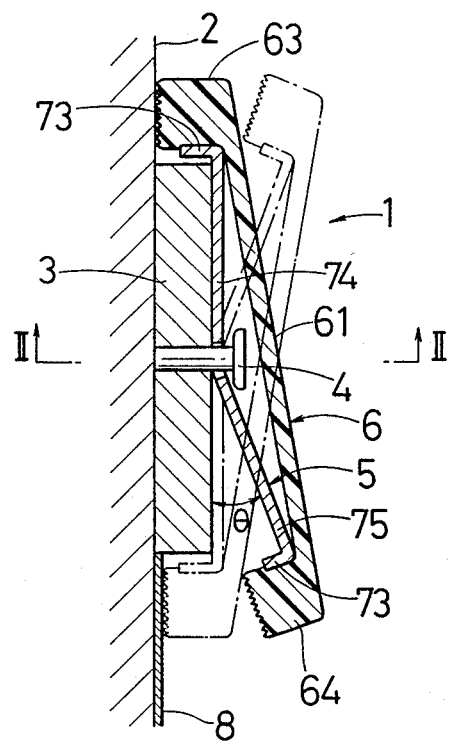
FIGS. 1, 2, 3 show the first embodiment of the invention.
Figure 2:
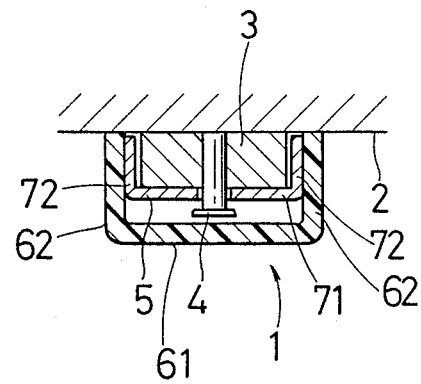
Figure 3:
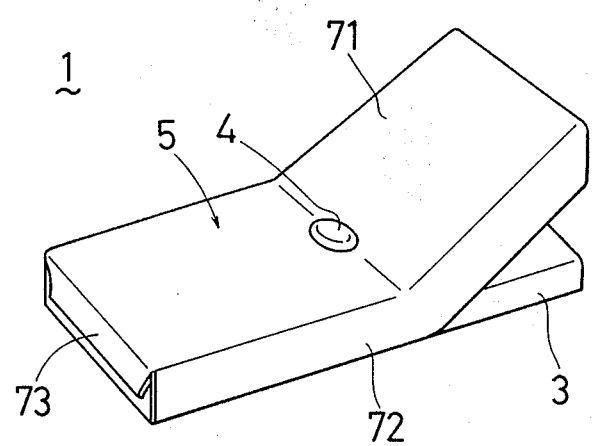

FIGS. 1, 2 and 3 illustrate a magnetic holder 1 which represent the first embodiment of the present invention.

The magnetic holder 1 consists of a board-type magnet 3, a movable body 5 and a covering body 6. The under surface of the board-type magnet 3 is attached by magnetic force to a surface 2 upon which a magnet is able to function; for example to the side surface of an item of steel furniture. The movable body 5 is made of a material such as iron or steel in order that the magnet 3 may be attracted and attached to its surface. A pin 4 is set into the center point of the magnet 3 and the movable body 5 to allow either section of the movable body to be attracted and attached to the upper surface of the magnet 3. The covering body 6 is made of plastic and is set to cover the movable body 5.

The movable body 5 is a rain-pipe type construction of a squared U-shape which is bent at the centre of the longitudinal direction at an appropriate angle $\theta$ so that the opened surface faces the outside. The pin 4 is pierced into the center of the body 5 on the line at which the body is bent.

The movable body 5 consists of a top surface 71, side surfaces 72 and end surface 73. The top surface 71 of the body is bent to from two sections 74 and 75 with the pin 4 at the center point. The under surface of either 74 or 75 may be attached to the upper surface of the magnet 3. The side surfaces 72 of the body stand vertically on the right and left edges of the top surface 71 of the movable body. The end surfaces 73 stand vertically on the front and rear edges of the top surface. The end surfaces 73 are shorter than the side surfaces 72.

When section 74 is attracted to and attached by magnetic force to the upper surface of the magnet 3, section 75 is separated from the upper surface of the magnet 3 by the appropriate angle $\theta$. When section 75 is attached to the magnet 3 section 74 is separated therefrom.

The side surfaces 72 of the movable body stand vertically on the right and left edges of the top surface and thus are parallel to the magnetic pole direction which is the vertical direction against the face of the magnet 3. The same principle that applies to a horse shoe magnet results in a strong magnetic force being present at the top of each side surface.

The covering body 6 includes a of the horizontal surface 61, leg parts 62 and the clipped parts 63 and 64. The horizontal surface 61 faces the top surface 71 of the movable body 5.

The leg parts 62 stand vertically on the right and left edges of the horizontal surface 61. The inner surface of the leg parts 62 are attached to the side surfaces 72 of the movable body 5.

The clipping parts 63 and 64 are set on the front and rear edges of the horizontal surface 61. The clipping parts 63 and 64 are attached to the end surfaces 73 of the movable body 5.

The under surface of the covering body 6 is set on both edges of the longitudinal direction of the top surface 71 and the end surface 73 of the movable body 5.

When either section 74 or 75 of the top surface 71 of the movable body 5 is attached by magnetic force to the upper surface of the magnet 3 the corresponding clipping part 63 or 64 is held against the surface 2 upon which the magnet 3 is fastened. Thus the clipping part 63 or 64 of the covering body 6 is able to hold a paper 8 against the surface 2.

Furthermore, the under surfaces of the clipping parts 63, 64 are a saw-tooth shape to increase the effectiveness of the holding force on the paper 8.

FUNCTION OF THE MAGNETIC HOLDER 1, FIRST EMBODIMENT

The under surface of the magnet 3 is held to the surface 2 by magnetic force. The upper surface of the magnet 3 faces the movable body 5. As shown in FIG. 1, one section 74 of the top surface of the movable body is attached to the magnet 3 by magnetic force. The section 74 is situated in the upper position and section 75 of the top surface of the movable body 5 is separated from the magnet 3 by the appropriate angle $\theta$.

A paper 8 is inserted between the clipping part 64 which is situated in the lower position of the covering body 6. The lower part of the covering body 6 which is set as a cover on the movable body 5 is pushed. The covering body 6 and the movable body 5 to which it is attached moved against the center point which is the pin 4. As the imaginary lines in FIG. 1 indicate, when the lower part of the magnetic holder 1 is pushed the upper section 74 of the movable body 5 is separated from the magnet 3 and the lower section 75 is attracted to and attached to the magnet 3 by magnetic force and the paper 8 is held between the lower clipping part 64 of the covering body 6 and the surface 2. Thus the paper 8 is held firmly to the surface 2. The action necessary to accomplish this can be performed by one hand with a single movement.

By pushing the upper part of the covering body 6 the movable body 5 turns on the pin 4 so that the upper section 74 of the movable body is attached to the magnet 3. Thus the clipping part 64 is removed from the paper 8 by a single movement of one hand. This action can also be performed by picking up one part of the paper 8 by hand and pulling up.

Furthermore the magnet 3 remains fixed to the surface 2 throughout the operations required to hold or remove a paper from the surface. Thus, there is no possibility of the position of the magnetic holder 1 changing or of the magnetic holder 1 being dropped from the surface 2.

Since it is not necessary to strengthen the magnetic force of the magnet 3 in order to prevent the possibility of the magnetic holder 1 being dropped during operation little force is required to perform the required operations. The cost of producing the magnetic holder 1 is low since only one relatively weak magnet is required.

FIGS. 4 and 5 illustrate a magnetic holder 10 which represents the second embodiment of the present invention.

The magnetic holder 10 consists of a disk-type magnet 3, a disk-shaped movable body 5 and a disk-shaped covering body 6.

The disk-shaped movable body 5 has a circular flange edge 112 around the edge of its top surface 111. The top surface 111 of the movable body is bent to form a triangular cone shape, so that the opened side faces outwards. A pin 4 is pierced through the apex of the cone which is the center of the top surface 111 of the movable body. The pin 4 is pierced through the top surface 111 and the magnet 3 in order to allow the top surface to move easily against the magnet.

The top surface 111 is bent to be separated into three sections 113, 114, 115 radially centering on the center point at which the pin 4 is attached to the magnet 3.

When any one of the sections 113 or 114 or 115 is attached to the upper surface of the magnet 3 by magnetic force, the other two sections are separated from the upper surface of the magnet 3 at the appropriate angle.

The covering body 6 consists of the horizontal disk-shaped surface 121 and three clipping parts 122, 123 and 124. The horizontal surface 121 of the covering body faces the top surface 111 of the movable body 5. The three clipping parts 122, 123 and 124 are set around the circular edge of the horizontal surface 121. Each clipping part is set on the movable edge of one of the separated sections of the top surface 111 of the movable body.

The clipping parts 112, 123 and 124 are connected to the flanged edge 112 of the movable body 5. The covering body 6 is set on the movable body 5 by attachment of the rounded inner surface of the covering body 6 to the flanged edge 112 of the movable body 5.

When one of the sections of the horizontal surface 113, 114 or 115 of the movable body 5 is attached to the upper surface of the magnet 3 by magnetic force a paper 8 can be held to the surface 2 by the respective clipping part of the covering body.

FIG. 6 illustrates a magnetic holder 15 which represents the third embodiment of the present invention.

In the case of this magnetic holder the horizontal surface 111 of the movable body 5 is divided into four sections 113, 114, 115, 116 radially centering on the pin 4 which attaches the movable body to the magnet at the center point. When any one of the separate sections 113, 114, 114 or 116 is attached to the upper surface of the magnet the other three sections are separated from the upper surface of the magnet at the appropriate angle since the movable body has been bent to satisfy this purpose as previously described for the other embodiments of the present invention.

The covering body which is set on the movable body has four clipping parts which are attached to the vertical circular edge of each of the four sections of the movable body. When any one of the four sections of the movable body is attached to the magnet by magnetic force the respective clipping part can hold a paper to the surface upon which the magnetic holder is placed. The other aspects of the third embodiment of the present invention are the same as previously described for magnetic holder 10, which represents the second embodiment.

The second and third embodiments of the present invention have the same functions and the same operating principles as the first embodiment. The essential difference is that the second and third embodiments can hold a paper respectively in three and four directions against the surface upon which the magnetic holder is placed. Thus the second and third embodiments have an advantage of greater convenience and flexibility of use.

In each of the embodiments previously described the clipping parts are part of the covering body 6 which covers the movable body 5. However, the clipping parts can also be constructed so as to attach independently to the movable body 5. Furthermore in each of the embodiments the surface 2 upon which the magnetic holder is placed is described as a magnetic body. However, the surface 2 can also be constructed of a diamagnetic body; for example wood or glass. In that case the magnet 3 of the magnetic holder is attached to the surface by a pressure sensitive adhesive double coated tape.

I claim:

1. A magnetic holder comprising:
   a magnet attachable to a substrate;
   pivoting means attached to said magnet;
   a movable body pivotably attached to said pivoting means, said movable body being substantially disk-shaped and having at least three nonparallel sections pivotable about said pivoting means and movable toward and away from the substrate, said at least three sections being substantially pie-shaped and the apices thereof being located substantially at said pivoting means, each section of said at least three nonparallel sections including material to which said magnet is attracted and attachable, each section of said at least three nonparallel sections defining an angle relative to the other at least one section of said at least three sections, the angle being sufficiently great for contacting and attaching only one section of said at least three nonparallel sections at a time with said magnet; and
   clip means attached to each section of said at least three sections for clipping objects between said clip means and the substrate when the section to which said clip means is attached contacts said magnet.

2. A magnetic holder as in claim 1, further comprising a covering body covering the outer surface of said movable body and attached thereto.

3. A magnetic holder as in claim 2, wherein said clip means are attached to said covering body.

4. A magnetic holder comprising:
   a magnet attachable to a substrate;
   pivoting means attached to said magnet;
   a movable steel body pivotably attached to said pivoting means, said movable body being substantially disk-shaped and having at least three nonparallel sections pivotable about said pivoting means and movable toward and away from the substrate, said at least three sections being substantially pie-shaped and the apices thereof being located substantially at said pivoting means, each section of said at least three nonparallel sections including material to which said magnet is attracted and attachable, each section of said at least three nonparallel sections defining an angle relative to the other at least one section of said at least three sections, the angle being sufficiently great for contacting and attaching only one section of said at least three nonparallel sections at a time with said magnet; and
   clip means attached to each section of said at least three sections for clipping objects between said clip means and the substrate when the section to which said clip means is attached contacts said magnet.

5. A magnetic holder as in claim 4, further comprising a covering body covering the outer surface of said movable body and attached thereto.

6. A magnetic holder as in claim 5, wherein said clip means are attached to said covering body.

* * * * *